United States Patent
Pajard

[19]

[11] Patent Number: 6,036,172
[45] Date of Patent: Mar. 14, 2000

[54] BUTTERFLY VALVE

[75] Inventor: Claude Pajard, Cormeilles en Parisis, France

[73] Assignee: Magneti Marelli France, Nanterre, France

[21] Appl. No.: 09/147,039

[22] PCT Filed: Mar. 12, 1997

[86] PCT No.: PCT/FR97/00433

§ 371 Date: Sep. 17, 1998

§ 102(e) Date: Sep. 17, 1998

[87] PCT Pub. No.: WO97/35131

PCT Pub. Date: Sep. 25, 1997

[30] Foreign Application Priority Data

Mar. 18, 1996 [FR] France .................................. 96 03336

[51] Int. Cl.[7] ........................................................ F16K 31/44
[52] U.S. Cl. ........................................... 251/250; 251/305
[58] Field of Search ................................... 251/250, 305, 251/306, 308, 304, 248

[56] References Cited

U.S. PATENT DOCUMENTS 2,471,180  5/1949  Wightman .
3,726,575  4/1973  Moorman .
4,659,064  4/1987  Scobie et al. .
4,846,441  7/1989  Scobie et al. .
5,370,361  12/1994  Mendell et al. ......................... 251/305
5,503,367  4/1996  Thompson et al. ..................... 251/305
5,522,361  6/1996  Pickman et al. ........................ 251/305

FOREIGN PATENT DOCUMENTS 2 606 115  5/1988  France .
39 24 611  1/1991  Germany .
42 40 783  6/1994  Germany .
2 042 124  9/1980  United Kingdom .
2 181 820  4/1987  United Kingdom .

*Primary Examiner*—David J. Walczak
*Attorney, Agent, or Firm*—Henderson & Sturm LLP

[57] ABSTRACT

A device with a body and a passage therethrough containing a pivotable throttling member and a shaft rotatably mounted in the body and axially retained therein by a fork with a rounded central portion. The fork includes at least one tooth which engages at least one recess such as a groove in an end portion of the shaft. The end portion being housed in a chamber of the body that is sealed by a cover positioning the fork in the chamber in such a way that it engages the groove. The device is particularly suitable in butterfly valves and flow control components for controlling the flow of supply air in an internal combustion engine or that of recirculated exhaust gases.

14 Claims, 2 Drawing Sheets

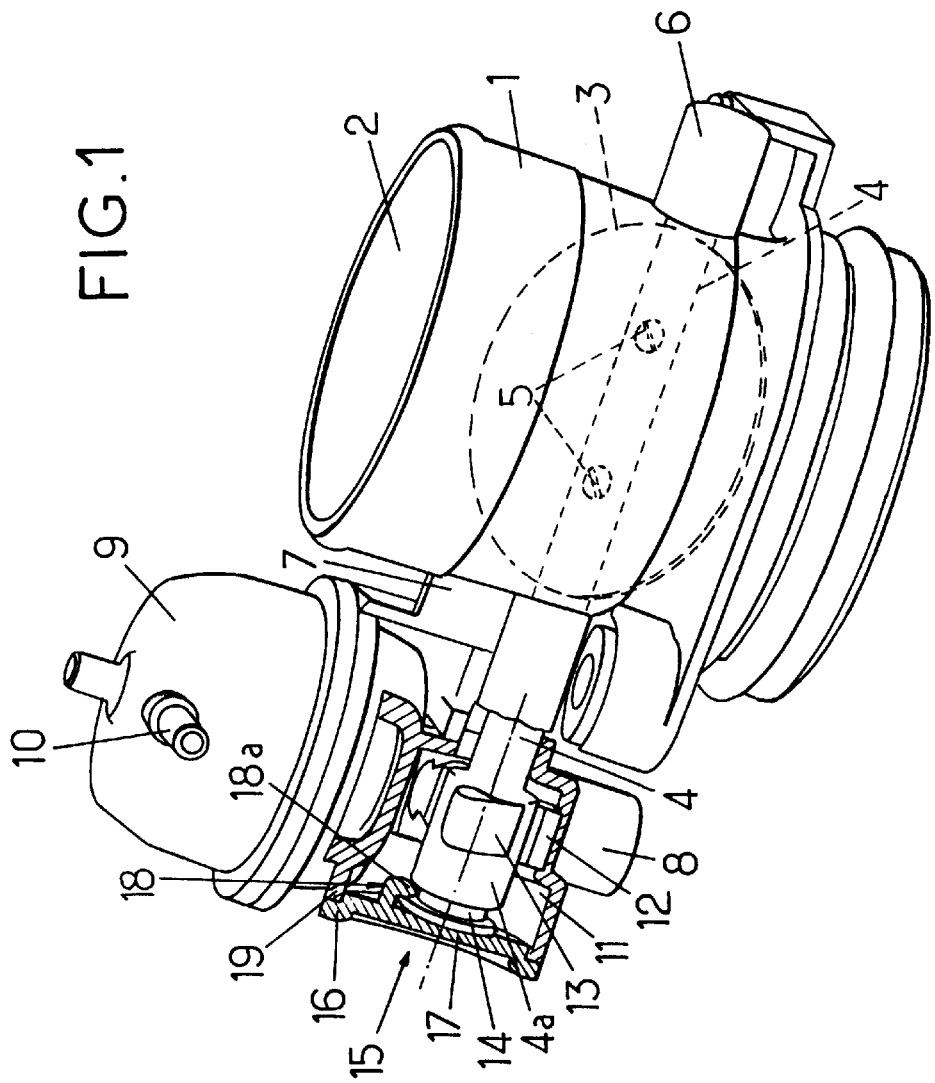
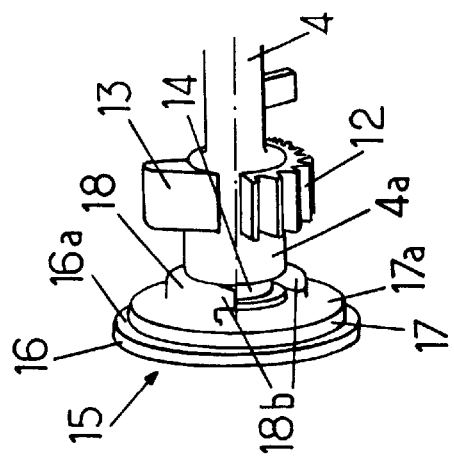

BUTTERFLY VALVE

BACKGROUND OF THE INVENTION

1. Field of the Invention

The invention relates to devices for metering a flow rate of gas, such as those know as throttle bodies, for metering combustion air supplied to internal combustion air supplied to internal combustion engines, or alternatively metering bodies, for metering recirculated exhaust gases.

2. Description of the Prior Art

U.S. Pat. No. 4,846,441 discloses a valve, that can be used as a device for metering a fluid flow rate. The valve is of the type comprising a body through which there passes at least one passage in which an approximately disk-shaped throttling member, generally called a butterfly, is mounted to rotate with a shaft transverse to said passage and journal-mounted in the body on each side of the passage. The valve also comprises an end part of which is housed in a chamber formed in the body on one side of said passage and opening laterally to the outside of the body. The end part of the shaft has at least one recess, delimited by a step or a groove, in which recess there is engaged, substantially tangentially to the shaft, at least one tooth which axially locks the shaft in the body, being held in the body by a locking member kept in position in said chamber by means of a plug that closes said chamber.

In U.S. Pat. No. 4,846,441, the shaft is made up of two separate shaft parts, each of which is journal-mounted in a respective one of two lateral bearings of the body and has its external axial end housed in a respective one of two chambers of the body which open laterally to the outside thereof. Each shaft part is fixed to the throttling member of radial screws.

Two teeth, which are cylindrical rods, are introduced independently of one another and tangentially into the annular groove of at least one of the shaft parts and into straight transverse and parallel housings in the locking member. The locking member is a sleeve surrounding the end of the shaft part that has the groove. The sleeve is engaged in the corresponding lateral chamber of the body, so as to retain the cylindrical rods that axially lock the shaft part. In this chamber of the body, the axial positioning of the sleeve is provided by screwing or unscrewing a threaded plug. The screw is screwed into this chamber, without coming into axial abutment against the body, so as to adjust the axial position of the shaft within the body and the position of the throttling member in the passage, to allow it to rotate therein.

Assembling the valve and axially adjusting the shaft parts and the throttling member are lengthy and complicated. Each shaft part which has a groove is introduce into the corresponding sleeve. Then the cylindrical rods that form teeth for axially locking the corresponding shaft part are mounted in the groove and in the sleeve. The subassembly obtained is then mounted in its bearing in the body and connected to this body by screwing the threaded plug. Each shaft part is then fixed to the throttling member by screwing. Finally, the throttling member is centered with respect to the passage of the body by rotating the threaded plug, then immobilizing this plug in position with respect to the body when the desired axial position has been obtained.

The drawbacks of such a device are that it is of a structure, assembly and adjustment that are complicated and expensive and imply accessibility that cannot be given to throttle bodies or metering bodies for metering the flow rate of gases such as combustion air or recirculated exhaust gases.

The problem underlying the invention is that of overcoming the drawbacks of the know devices of the aforementioned type, and of proposing an improved device which is better suited than the know devices to the various requirements of real life. Particularly in the applications to the metering of flow of combustion air supplying an internal combustion engine or to the metering of recirculated exhaust gases.

BRIEF SUMMARY OF THE INVENTION

One object of the invention is to propose a metering device of this type, in which simple and economical means allow the teeth and the locking member and the shaft to be mounted, without screwing, in their correct position of interaction. Thus allowing the throttling member to rotate in the passage of the body, as soon as the plug occupies a single mounted position on the body, in which position this plug is fixed directly bearing against an axial stop of the body. The plug closing the lateral chamber of the body, into which chamber the plug penetrates and the locking teeth are engaged in a correct position of interaction with the recess of the shaft.

The improvements which are the more particular subject of the present invention relate to the production of a specific locking member, and to its mounting in the body, and to the production of the latter and of the shaft in a way that is appropriate to interaction with this locking member, so as to simplify the structure of the metering device and make it quicker to mount in the optimum position for interaction of the tooth or teeth with the recess in the shaft, without special adjustments, in order to obtain a metering device that is more economical than those currently used.

Furthermore, in the known devices for metering gases, the other end part of the shaft, on the other side of the passage and of the throttling body mounted therein, is generally housed in another chamber opening laterally to the outside of the body, in a lateral protrusion of this body, and housing not only this other end part of the shaft, but also, and at least partially, drive means of rotating the shaft and of rotating the throttling member. These drive means housed in this other chamber may be a linkage of a transmission connecting an actuator, mounted laterally on the outside of the body, to the shaft, or alternatively may be directly a part of such an actuator, which may be of any appropriate type, for example an actuator with rotary or linear travel, with a diaphragm and with a rack interacting with teeth on the shaft, or with a screw-nut system that converts the linear movement of the actuator into a rotation of the shaft and of the throttling member.

After the shaft has been fitted into the body and the locking member has been fitted onto the body and into the recess or groove in the shaft, the opening of the other chamber of the body to the outside is sealed with another plug attached to the body in a demountable or nondemountable way.

The known gas-metering devices have the additional drawback that their structure has to comprise two chambers, arranged one on each side of the passage, generally in lateral protrusions of the body. Each open laterally to the outside of the body in order to allow the operations of mounting, centering and adjustment in each of the chambers, so as to ensure interaction between the shaft and the means of rotating it, on the one hand, on the other hand, the locking member. The two chambers must then be closed.

This results in a complicated structure that requires various machining operations, in the case of a metallic body, or molding operations using several inserts, in the case of a body that is molded of synthetic material. An additional result is the relatively lengthy and tricky mounting operations on the two end parts of the shaft, on which shaft the throttling member or butterfly is then fixed.

Another object of the invention is to propose such a metering device that is equipped with a locking member whose structure allows easy fitting of the locking teeth into the recess or groove of the shaft and advantageous sitting within the body. This simplifies the production at least of the body and of the shaft of the device and reduce its assembly time so that it will be more economical.

To this end, the metering device according to the invention, of the type outlined hereinabove, is characterized in that said locking member is a fork of a single piece with each tooth. The fork and said plug are also of a single piece having a centering portion engaging axially in said chamber, and at least one radial part for bearing against a corresponding axial abutment surface of the body to limit the axial engagement of said centering portion in said chamber in the position in which each tooth of said for interacts with said recess of the shaft with a small axial clearance allowing the throttling member to rotate freely in the passage.

A fork of this kind is easy to produce and can easily be fitted onto the shaft by an approximately radial movement with respect to the latter, so that at least one tooth is engaged in the recess while the end part of the shaft that has this recess is kept temporarily accessible outside the body by a limited axial movement of the shaft with respect to its definitive position in the body. The axial movement of the shaft and the fork and of the plug toward the inside of the body, as far as the position in which the plug bears axially against the body, allows the desired correct position to be reached.

Advantageously, to ensure better axial retention, while accurately providing the small axial clearance needed, the fork comprises two teeth substantially parallel to one another and engaged in substantially diametrically opposed parts of the recess. The recess being produced in the form of a groove, of the shaft.

In order further to improve the axial retention of the shaft using a fork of improved strength and/or a fork in which the teeth are less highly stressed, the teeth of the fork advantageously project from one and the same side of a rounded part, substantially in the shape of a semi-circle, of said fork. The rounded part also being engaged in said groove of the shaft.

In addition, the chamber housing the end part of the shaft which has the recess or the groove may also, at least partially, house means of rotating the throttling member and of rotating the shaft, which is advantageously of a single piece and passes through the passage.

This embodiment has the advantage that the recess or the groove, the fork axially locking the shaft and the means of rotating the latter are housed in one and the same chamber of the body, on the same side of the passage. This chamber can be closed by a single plug. The opposite end part of the shaft can be journal-mounted in a blind bore made in a lateral part of the body and which may be molded in when the body is, for example, molded as a single piece of synthetic material.

In a simplified embodiment, said fork projects from an internal radial face of said centering portion and is formed as a length of cylinder engaged axially in a corresponding cylindrical bore partially delimiting said chamber. The length of cylinder itself projects from an internal radial face of a cylindrical plug of larger diameter bearing axially, via its internal radial face, against an annular stop of the body, around the entry to said chamber.

In this embodiment, the single piece that makes up the plug and the fork may advantageously be molded as a synthetic material.

When the means of rotating or of maneuvering the shaft and the throttling member comprise an actuator with rectilinear travel, for example with a diaphragm, it is furthermore advantageous for said recess or said groove of the shaft to be produced on said end part axially outside a toothed sector and a rotation stop which are borne by the shaft. The toothed sector and stop interact respectively with a rack of said rotation of the throttling member in the position in which the passage is wide open, the axial dimension of the teeth of the toothed sector being such that said teeth remain in mesh with said rack while at the same time allowing said end part of the shaft to be withdrawn axially out of said chamber by far enough for said fork to be fitted into said recess or said groove of the shaft.

The plug may be fixed to the body by nondemountable means, such as by welding or the deformation of material, such as crimping, or alternatively by demountable means, such as at least one radial lug of the plug screwed to the body. Nondemountable means of attachment do not require prior and special angular orientation of the shaft and, for example, of the toothed sector it may carry for engagement in the position of interaction with the rack of the driving actuator. Whereas, on the contrary, demountable means of attaching the plug may render such a prior angular-orientation operation necessary.

Finally, the metering device has the advantage that the various technical measures outlined hereinabove are compatible with a body and/or a shaft which is or are molded as a single piece made of synthetic material.

BRIEF DESCRIPTION OF THE SEVERAL VIEWS OF THE DRAWINGS

Other advantages and features of the invention will emerge from the description given hereinbelow, without implied limitation, of one embodiment that is described with reference to the appended drawings, in which:

FIG. 1 is a view in perspective of a metering device, part of which, in the region of the fork interacting with the shaft, has been depicted partially in axial section and partially in side elevation, FIG. 3 depicts partially in perspective the end part of the shaft with a groove in which the fork of the plug is mounted.

DETAILED DESCRIPTION OF THE INVENTION

Figure 2:
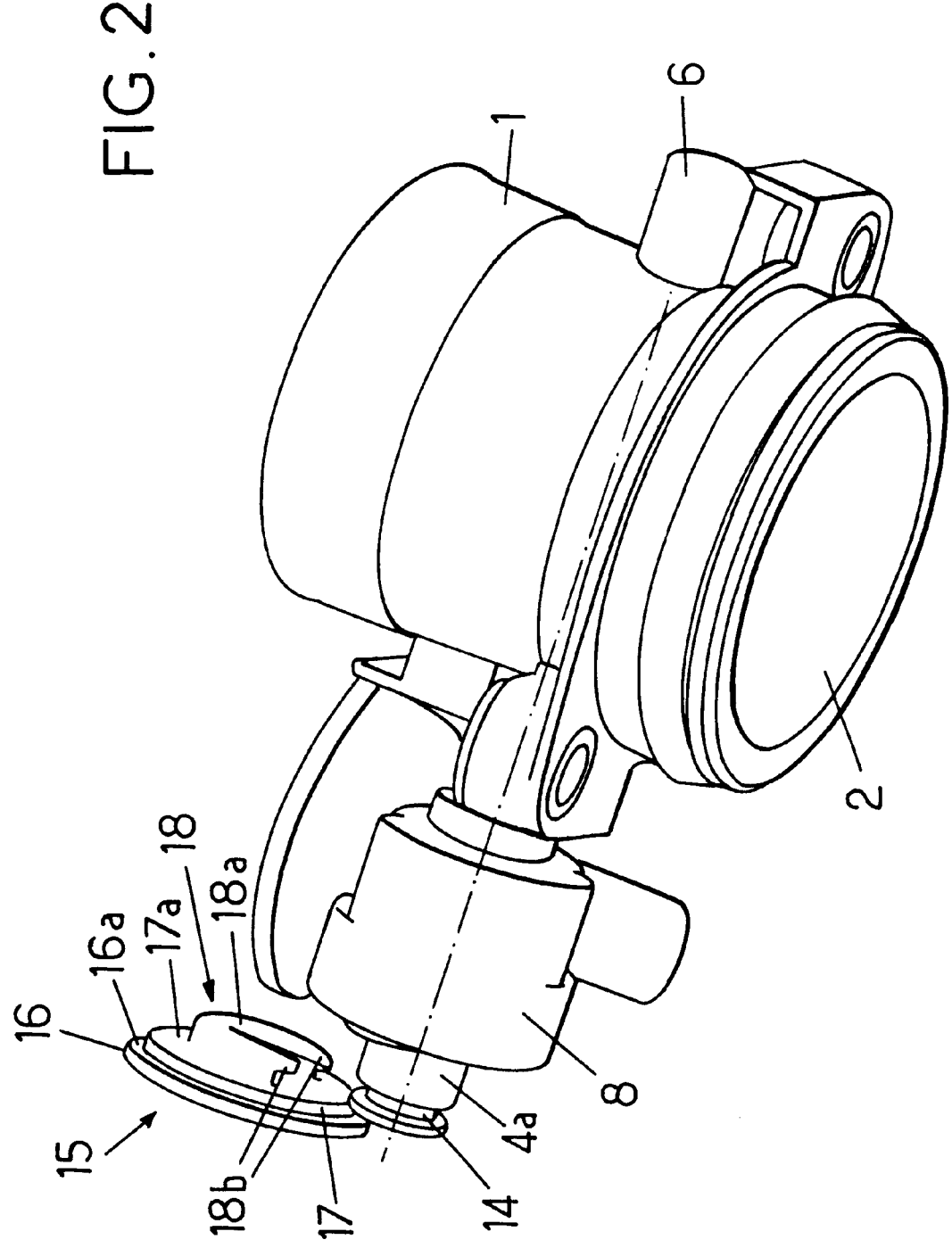
FIG. 2 depicts partially and in side elevation the metering device of FIG. 1, the shaft of which has been withdrawn slightly for the fitting of the plug with locking fork.

Depicted as 1 in FIG. 1 is a tubular central part, of cylindrical overall shape, of a metering body through which there passes a passage 2 intended for the passage of a gas. The flow rate of which is to be metered by adjusting the angular position, within the passage 2, of a disk-shaped throttling member 3, know as a butterfly, and depicted in chain line in FIG. 1. In the known way, the butterfly 3 is inserted into a diametral slot through a shaft 4 to which the butterfly 3 is fixed by two screws 5.

The shaft 4 is a shaft transverse to the body I and to the passage 2 which is, for example, cylindrical and which the shaft 4 crosses diametrically, being journal-mounted, on each side of the passage 2, in bearings in the body 1.

One of the bearings is formed by the wall of a blind bore (not depicted in FIG. 1) made in a small lateral part 6 of the body 1, while the other bearing 7 is arranged in a portion connecting to the body 1 a second lateral part 8 integral with the body 1 and approximately diametrically opposite the small part 6.

The lateral part 8 of the body 1 supports an actuator, the cover of which is depicted as 9, for rotating the assembly formed of the shaft 4 and of the butterfly 3. This actuator is, for example, a diaphragm actuator delimiting, within its cover 9, two chambers, one of which is supplied with pressurized gas or placed in communication with a vacuum source via a fitting 10. The movements of the diaphragm being transmitted, in the know way, to a rack (not visible in the figures) which is moved back and forth in a straight path in the lateral part 8 of the body 1.

This lateral part 8 also has an internal chamber 11 which opens laterally to the outside of the body 1, on the opposite side to the passage 2.

This chamber 11 houses the end part 4a of the shaft 4, which is the opposite end part to the part which is journal-mounted in the blind bore of the small lateral part 6. The end part 4a, as depicted in FIG. 3, has a larger diameter than the rest of the shaft 4 and carries, approximately in the same axial part, a toothed sector 12 with axial teeth projecting radially outward from the shaft 4. The toothed sector 12 interacts, in a lateral part of the chamber 11 inside the part 8 of the body 1, with the rack, which can be moved in this lateral part 8, of the maneuvering actuator. The end part 4a also includes a rotation stop 13, intended to come to bear against a stop on the body 1, projecting into the chamber 11, to limit the rotation of the shaft 4 and of the butterfly 3 in an angular position of the butterfly 3 within the passage 2 that corresponds to this passage 2 being wide open.

The end part 4a of the shaft 4 also has, near its end, that is to say axially on the outside of the toothed sector 12 and of the rotation stop 13, a peripheral recess in the form of an annular groove 14 depicted in FIGS. 1 and 2 and partially visible in FIG. 3.

The opening of the chamber 11 toward the outside of the lateral part 8 of the body 1 is closed by a plug 15 which comprises a disk or external annulus 16, in the form of a length of cylinder of large diameter. From the internal radial face 16a there projects an internal disk 17 in the form of a length of cylinder coaxial with the annulus 16 but of smaller diameter than the latter. A fork 18 projects in turn from the internal radial face 17a of the internal disk 17.

This fork 18 has a rounded central part 18a projecting radially, that is to say at right angles to the common axis of the external annulus 16 and of the internal disk 17. This rounded central part 18a, which is concave in shape so that it can fit into the groove 14 of the shaft 4 and around a part smaller than half of the circumference of the bottom of this groove 14, is extended, at its two ends, in the circumferential direction, by two teeth 18b which are substantially mutually parallel and also oriented at right angles to the common axis of the annulus 16 and of the disk 17. Thus, when the central part 18a of the fork 18 is engaged in the groove 14, the two teeth 18b of the fork 18 are also engaged in the groove 14, each substantially tangentially in a respective one of two substantially diametrically opposed parts of this groove 14. The two teeth 18b of the fork 18 project, at right angles to the common axis of the disks 16 and 17, on the same side of the rounded central part 18a extending substantially over a semi-circle centered on this common axis of the disks 16 and 17.

In the position in which the chamber 11 is closed, the plug 15 is fixed to the lateral part 8 of the body 1. The plug 15 bearing via the internal radial face 16a of its external annulus 16 against an axial stop surface consisting, on the part 8 of the body 1, of the annular stop surface 19 surrounding the cylindrical bore delimiting the entry to the chamber 11. The fact that the annulus 16 bears against the annular axial stop 19 of the body 1 limits the axial engagement of the internal disk 17 of the plug 15 into the entry bore of the chamber 11, in which bore the plug 15 is centered by its internal disk 17. This axial engagement of the centering disk 17 in the chamber I 1 is limited by the external annulus 16 in the position in which the fork 18 interacts with the groove 14 of the shaft 4 and, by construction, the width in the axial direction of the teeth 18b and of the rounded central part 18a of the fork 18 is smaller than the axial dimension of the groove 14. The fork 18 axially locks the shaft 4 with a small axial clearance necessary for positioning the butterfly 3 in the passage 2 so that the butterfly can rotate freely with the shaft 4 in this passage 2. The fork 18 is thus held positioned in the chamber 11, in a position of interaction with the groove 14, by means of the plug 15 that closes this chamber 11 and with which the fork 18 forms a single piece.

On assembling the device, before the butterfly 3 is introduced into the passage 2 and the butterfly 3 is fixed to the shaft 4, this shaft 4 is engaged axially into the chamber 11 and mounted in the bearing 7. The bearing of the blind bore of the lateral part 6 of the body 1, carries out necessary indexing in terms of angular position in order to being the teeth of its toothed sector 12 into mesh with the rack of the maneuvering actuator, in an appropriate angular position. The axial dimension of the teeth of the toothed sector 12 is such that its teeth remain in mesh with the rack while at the same time allowing the end part 4a of the shaft 4 to be withdrawn axially out of the chamber 11 by far enough, as depicted in FIG. 2, to uncover the groove 14 and make it accessible for engaging the teeth 18b in this groove 14, by an approximately radial overall movement of the plug 15.

After the fork 18 has been fitted into the groove 14 of the shaft 4, the plug 15 occupies, with respect to the corresponding end part 4a of the shaft 4, the position depicted in FIG. 3. The assembly comprising the shaft 4 and the plug 15 mounted on the latter is then moved axially into the position of FIG. 1, and the plug 15 is held on the body 1, keeping its external annulus 16 bearing axially against the annular stop 19 of the part 8 of the body 1 by means of fixing the plug 15 to the body 1.

These fixing means are chosen to suit the material of which the body 1 and the plug 15 are made.

When the body 1 and the plug 15 are made of metal, for example of an aluminum alloy, the annulus 16 of the plug 15 may be held by crimping or upsetting material into a counterbore in the lateral part 8 of the body 1, around the annular axial stop 19, in a nondemountable way. Alternatively the annulus 16 of the plug 15 may have one or more radial lugs fixed to the lateral part 8 of the body 1 by screws, in a demountable way.

If the body 1 and the plug 15 with the fork 18 are each molded as a single piece of a synthetic material, the plug 15 may be fixed to the body 1 in a nondemountable way for example by ultrasound or vibration welding of the annulus or disk 16 to the part 8.

The nondemountable methods of fixing have the advantage of not requiring special angular positioning of the plug 15 with respect to the body 1. By contrast, producing a plug 15 with lugs for screw-fastening to the body I requires such angular positioning of the plug 15.

It should be noted that the shaft 4 may also be molded as a single piece of a synthetic material with its groove 14, its toothed sector 12 and its rotation stop 13.

The structure of the device described has the advantage that each of its three essential constituent components may be molded as a single piece out of plastic. In addition, all the operations of assembly, centering and fixing are concentrated into the lateral part 8 of the body 1 and int the chamber 11 of this part 8. This results in a saving in time taken to mount the shaft in the position of FIG. 1, in which position the butterfly 3 can then be fixed to the shaft 4 in the conventional way.

What is claimed is:

1. Device for metering a flow rate of gas, especially of combustion air supplied to a combustion engine, and of recirculated exhaust gases, comprising a body through which there passes at least one passage, an approximately disk-shaped throttling member positioned in said at least one passage, wherein said throttling member is mounted to rotate with a shaft, wherein said shaft is transverse to said at least one passage and journal-mounted in the body on each side of said at least one passage, said shaft including an end part which is housed in a chamber formed in the body on at least one side of said passage and opening laterally to the outside of the body, wherein said end part of the shaft includes at least one recess, delimited by one of a step and a groove, said shaft being axially locked in the body by a locking member kept in position in said chamber by means of a plug that closes said chamber, wherein said locking member includes a fork and at least on tooth, said fork and said at least one tooth comprised of a single piece, wherein said fork and said plug are a single piece and include a centering portion which engages axially in said chamber, said locking portion including at least one radial part for bearing against a corresponding axial abutment surface of the body to limit the axial engagement of said centering portion in said chamber in the position in which each tooth of said fork interacts with said recess of the shaft with a small axial clearance allowing the throttling member to rotate freely in the passage; and wherein said fork comprises two teeth substantially parallel to one another and which engage said at least one recess of said shaft.

2. The device according to claim 1, wherein said fork projects from an internal radial face of said centering portion, said internal radial face being formed as a length of cylinder engaged axially in a corresponding cylindrical bore partially delimiting said chamber, said length of cylinder projecting from an internal radial face of a cylindrical plug of larger diameter and bearing axially against an annular stop of the body, around the entry to said chamber.

3. The metering device according to claim 2, wherein said chamber at least partially houses means for rotating the throttling member and means for rotating the shaft which is of a single piece and passes through the passage.

4. The metering device according to claim 2, wherein the plug is fixed to the body.

5. The metering device according to claim 1, wherein said at least one tooth of the fork project from the same side of a rounded part of said fork, said at least one tooth being substantially in the shape of a semi-circle, said rounded part also being engaged in said groove of the shaft.

6. The metering device according to claim 5, wherein said chamber at least partially houses means for rotating the throttling member and means for rotating the shaft which is of a single piece and passes through the passage.

7. The metering device according to claim 1, wherein said chamber at least partially houses means for rotating the throttling member and means for rotating the shaft which is of a single piece and passes through the passage.

8. The metering device according to claim 7, wherein said at least one recess of the shaft is positioned on said end part axially outside a toothed sector and a rotation stop which are borne by the shaft to interact respectively with a rack of said means of rotating the shaft and of rotating the throttling member, and with a stop on the body, for limiting the rotation of the throttling member in the position in which the passage is wide open, the axial dimension of the teeth of the toothed sector being such that said teeth remain in mesh with said rack while at the same time allowing said end part of the shaft to be withdrawn axially out of said chamber by far enough for said fork to be fitted into said at least one recess of the shaft.

9. The metering device according to claim 1, wherein the plug is fixed to the body.

10. The meter device according to claim 9, comprising means for fixing the plug to said body, said means for fixing being selected from the group consisting of nondemountable means and deformation of material.

11. The metering device according to claim 10, wherein said nondemountable means comprises welding.

12. The metering device according to claim 10, wherein said deformation of material comprises crimping.

13. The metering device according to claim 1, wherein at least one member selected from the group consisting of said body and said shaft molded as a single piece made of synthetic material.

14. The metering device according to claim 1, wherein the shaft is journal-mounted at the end opposite of the end on the chamber side in a blind bore made in a lateral part of the body.

* * * * *